US 8,886,898 B2

(12) United States Patent
Cypher et al.

(10) Patent No.: US 8,886,898 B2
(45) Date of Patent: Nov. 11, 2014

(54) EFFICIENT INTERLEAVING BETWEEN A NON-POWER-OF-TWO NUMBER OF ENTITIES

(75) Inventors: Robert E. Cypher, Saratoga, CA (US); Bharat K. Daga, Fremont, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1044 days.

(21) Appl. No.: 12/543,803

(22) Filed: Aug. 19, 2009

(65) Prior Publication Data

US 2011/0047346 A1     Feb. 24, 2011

(51) Int. Cl.
*G06F 12/06*     (2006.01)
(52) U.S. Cl.
CPC .................................. *G06F 12/0607* (2013.01)
USPC ........................ 711/157; 711/5; 711/E12.079
(58) Field of Classification Search
None
See application file for complete search history.

(56) References Cited

U.S. PATENT DOCUMENTS

| | | | | |
|---|---|---|---|---|
| 3,980,874 A * | 9/1976 | Vora | ............................... | 708/491 |
| 4,433,389 A * | 2/1984 | York et al. | ..................... | 711/216 |
| 4,918,600 A * | 4/1990 | Harper et al. | ................. | 711/157 |
| 5,293,607 A * | 3/1994 | Brockmann et al. | ............. | 711/5 |
| 5,668,974 A * | 9/1997 | Grassi et al. | ................... | 711/157 |
| 6,131,146 A * | 10/2000 | Aono | ............................ | 711/157 |
| 6,453,380 B1 * | 9/2002 | Van Lunteren | ................... | 711/5 |
| 2009/0043943 A1 * | 2/2009 | Hutson | ............................ | 711/5 |
| 2013/0311747 A1 * | 11/2013 | Kumar et al. | ................. | 711/206 |

* cited by examiner

*Primary Examiner* — Nathan Sadler
(74) *Attorney, Agent, or Firm* — Park, Vaughan, Fleming & Dowler LLP; A. Richard Park

(57) ABSTRACT

Some embodiments of the present invention provide a system that maps an address to an entity, wherein the mapping interleaves addresses between a number of entities. During operation, the system receives an address A from a set of X consecutive addresses, wherein the address A is to be mapped to an entity E in a set of Y entities, and wherein Y need not be a power of two. Next, the system obtains $F=\text{floor}(\log_2(Y))$ and $C=\text{ceiling}(\log_2(Y))$. The system then calculates L, which equals the value of the F least-significant bits of A. The system also calculates M, which equals the value of the C most-significant bits of A. Next, the system calculates $S=L+M$. Finally, if $S<Y$, the system sets $E=S$. Otherwise, if $S \geq Y$, the system sets $E=S-Y$.

20 Claims, 3 Drawing Sheets

EFFICIENT INTERLEAVING BETWEEN A NON-POWER-OF-TWO NUMBER OF ENTITIES

BACKGROUND

1. Field

The present invention generally relates to the design of computer systems. More specifically, the present invention relates to a technique for efficiently interleaving addresses between a number of entities in a computer system, wherein the number of entities need not be a power of two.

2. Related Art

In order to compensate for the relatively low bandwidth provided by certain types of memory, such as dynamic random-access memory (DRAM), many computer systems provide interleaved memory systems. In such memory systems, data is distributed across multiple memory modules, which enables the memory system to subsequently access the data from multiple memory modules in parallel, thereby increasing memory-system throughput. Conceptually, a memory interleaving can be viewed as a mapping from a set of X consecutive addresses (e.g., cache line addresses) to a set of Y entities (such as processors, DIMMs, ranks, memory banks, cache banks, etc.) such that groups of consecutive addresses tend to map to different entities. Memory interleaving is a useful technique for increasing bandwidth and reducing hot spots caused by spatial locality in programs.

More quantitatively, the "load" of a memory interleaving can be defined as the maximum number of addresses which are mapped to a single entity from any window of Y consecutive addresses. Interleaving techniques can be optimized to minimize this "load" metric, and in doing so to minimize hot spots.

A well-known memory interleaving technique is to map an address A to entity A modulo Y. This "modulo-based" interleaving technique has a load equal to 1 (which is the best possible). However, implementing a modulo Y operation in hardware can be expensive (in terms of latency, design complexity, and area). Thus, designs that use this modulo-based interleaving technique typically constrain Y to be a power of two (in which case the modulo operation simply involves extracting the log-base-two-of-Y least-significant bits of A).

An alternative technique supports interleaving among Y entities where Y need not be a power of two. In this alternative technique, Y is viewed as a sum of B different powers of two. This alternative interleaving technique partitions the Y entities into B groups, each of which contains a power-of-two number of entities. There is no interleaving between groups; the only interleaving that is done is within each group (which is fully interleaved). This alternative interleaving technique has a load which is a function of the size of the smallest group. For example, if Y=33, the smallest group contains 1 processor and the load is 33, which indicates that hot spots will be likely.

Hence, what is needed is a technique for interleaving addresses between Y entities, where Y need not be a power of two, which does not suffer from the drawbacks of the above-described techniques.

SUMMARY

Some embodiments of the present invention provide a system that maps an address to an entity, wherein the mapping interleaves addresses between a number of entities. During operation, the system receives an address A from a set of X consecutive addresses, wherein the address A is to be mapped to an entity E in a set of Y entities, and wherein Y need not be a power of two. Next, the system obtains $F=\text{floor}(\log_2(Y))$ and $C=\text{ceiling}(\log_2(Y))$. The system then calculates L, which equals the value of the F least-significant bits of A. The system also calculates M, which equals the value of the C most-significant bits of A. Next, the system calculates $S=L+M$. Finally, if $S<Y$, the system sets $E=S$. Otherwise, if $S \geq Y$, the system sets $E=S-Y$.

In some embodiments, $X=Y \cdot 2^N$.

In some embodiments, the address A is more than F+C bits in length, so that the F least-significant bits of A do not overlap the C most-significant bits of A.

In some embodiments, obtaining F and C involves directly computing F and C from X.

In some embodiments, obtaining F and C involves looking up precomputed values for F and C, wherein the values for F and C were precomputed from X.

In some embodiments, the conditional assignment (E=S if $S<Y$ and $E=S-Y$ if $S \geq Y$) is performed by using a subtraction circuit to compute S−Y, and then using a sign bit of S−Y as a select input to a multiplexer which selects E. If S−Y is negative, the multiplexer selects E to be S. Otherwise, if S−Y is positive, the multiplexer selects E to be S−Y.

In some embodiments, there exists a set of memory modules of varying sizes. In these embodiments, an entity is a virtual memory module, which is either a memory module of the smallest size in a set of memory modules, or a partition of a larger memory module which is equal in size to the memory module of the smallest size.

In some embodiments, the entity E is one of: a processor; a dual inline memory module (DIMM); a memory rank; a memory bank; and a cache bank.

In some embodiments, the address A is a memory address.

Figure 1:
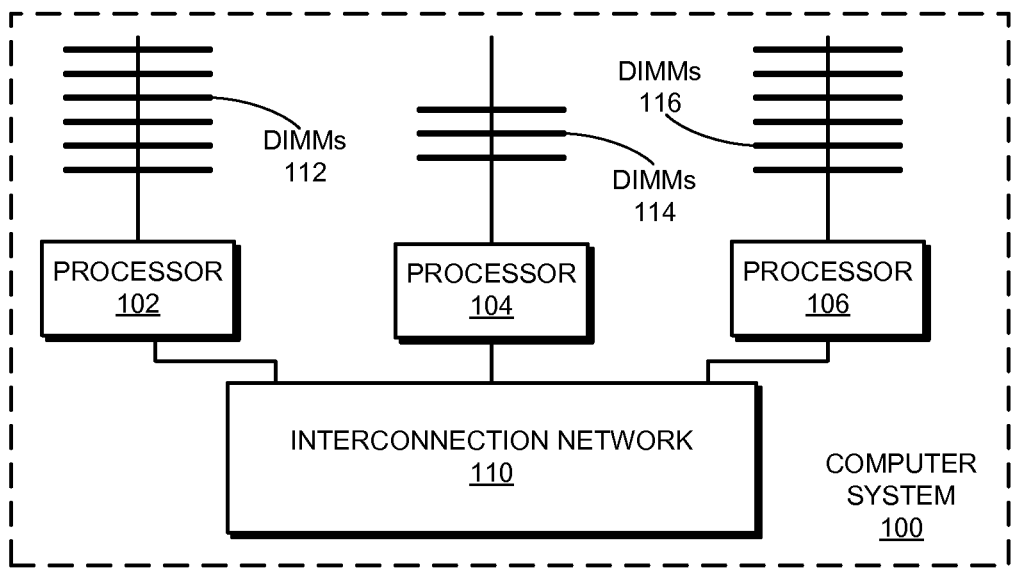
FIG. 1 illustrates a computer system in accordance with an embodiment of the present invention.

Table 1 illustrates a mapping for the case where X=16 and Y=4 in accordance with an embodiment of the present invention.

Table 2 illustrates a mapping for the case where X=12 and Y=3 in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

One embodiment of the present invention provides a technique for efficiently interleaving addresses between a non-power-of-two number of entities. This technique yields a load of at most 2, and is thus significantly better than the above-described alternative interleaving technique at reducing hot spots. Furthermore, the present invention does not require use of a non-power-of-two modulo operation, and is thus far easier and more efficient to implement than the modulo-based interleaving when Y need not be a power of two.

The case where Y need not be a power of two is very important in practice. For example, if the interleaving is between Y processors or DIMMs, the restriction that Y be a power of two can significantly limit the system configurations that are possible.

Furthermore, supporting interleaving between Y entities where Y need not be a power of two enables efficient interleaving of DIMMs with different capacities. This can be seen by defining a "virtual DIMM" as being a DIMM of the smallest capacity that is being used, or an equal-sized partition of a larger DIMM. In this case, the Y entities are the virtual DIMMs, and support for DIMMs with different capacities will typically result in Y not being a power of two.

More specifically, the present invention supports memory interleaving of X addresses between Y entities, where X is of the form Y times a power of two. Let $C=\text{ceiling}(\log_2(Y))$, wherein ceiling(Z) is the smallest integer greater than or equal to Z, and let $F=\text{floor}(\log_2(Y))$, where floor(Z) is the largest integer less than or equal to Z. Then, let L equal the value of the F least-significant bits of A, and let M equal the value of the C most-significant bits of A. Next, compute $S=L+M$.

Then, compute E where E equals S if $S<Y$, and E equals $S-Y$ otherwise. Note that this interleaving technique has a load of at most two. Also, note that the conditional assignment in the above formula can be implemented by having a circuit that calculates both S and S–Y in parallel, and uses a multiplexer (controlled by the sign bit of the quantity S–Y) to select between S and S–Y.

Hence, systems that use this technique can effectively interleave addresses between a non-power-of two number of entities, and they will not suffer from any significant hot spots caused by the interleaving (due to the fact that the load will be at most 2). Furthermore, such systems can support multiple DIMM sizes (for example, by using the "virtual DIMM" approach described above).

This technique is described in more detail below, but first we describe an exemplary computer system which uses this technique.

Computer System

FIG. 1 illustrates a computer system 100 in accordance with an embodiment of the present invention. Computer system 100 can generally include any type of computer system, including, but not limited to, a computer system based on a microprocessor, a mainframe computer, a digital signal processor, a portable computing device, a personal organizer, a cell phone, a device controller, or a computational engine within an appliance.

As illustrated in FIG. 1, computer system 100 includes three processors 102, 104 and 106, which are coupled together by an interconnection network 110. Each of the three processors 102, 104 and 106 is coupled to a number of DIMMs, which store code and data to be executed by the processor. More specifically, processor 102 is coupled to six DIMMs 112, processor 104 is coupled to three DIMMs 114 and processor 106 is coupled to six DIMMs 116.

The interleaving can take place across the three processors 102, 104 and 106 (where three is obviously not a power of two). For example, a set of cache lines can be interleaved using the above-described technique based on their cache line addresses across the three processors 102, 104 and 106.

The interleaving can also take place across the DIMMs. For example, if processors 102, 104 and 106 share the same address space, they can use the above-described technique to interleave their memory addresses across the 15 DIMMs in computer system 100 (wherein 15 is obviously not a power or two).

Although computer system 100 is illustrated as having a number of discrete components, in practice, and as recognized by those of ordinary skill in the art, the functions of computer system 100 may be distributed over a number of servers or computers, with various groups of the servers or computers performing particular subsets of the functions. In some embodiments, some or all of the functionality of computer system 100 may be implemented in one or more application-specific integrated circuits (ASICs).

Mapping Process

Figure 2:
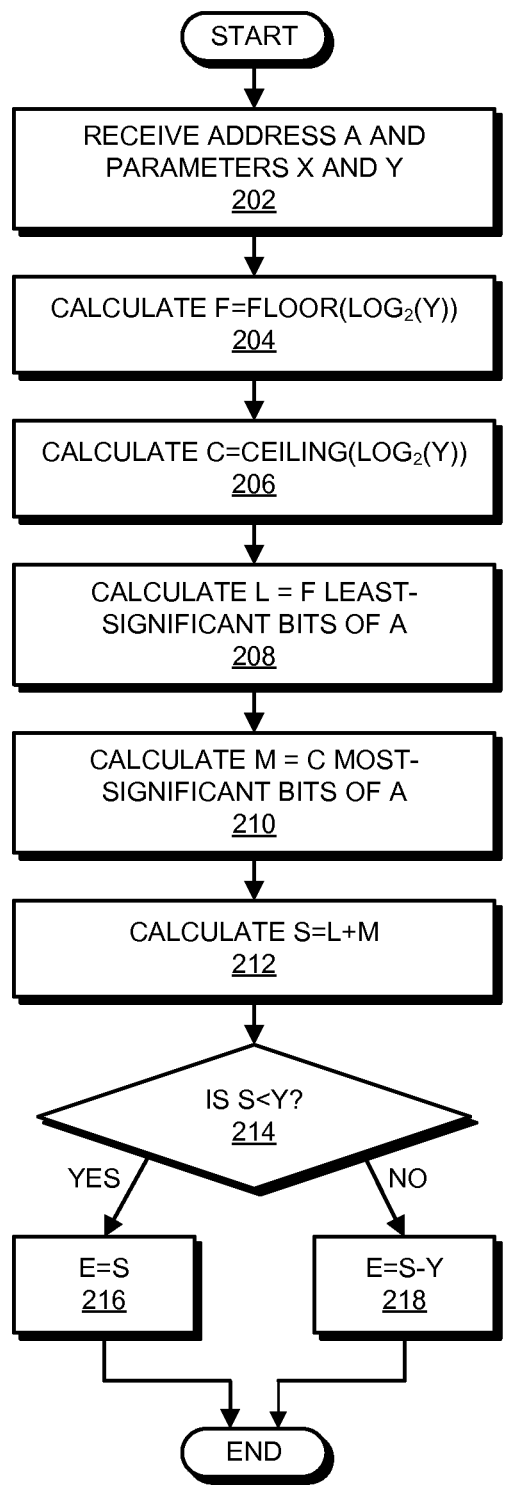
FIG. 2 presents a flow chart illustrating the process of mapping an address to an entity in accordance with an embodiment of the present invention.

FIG. 2 presents a flow chart illustrating the process of mapping an address to an entity in accordance with an embodiment of the present invention. During operation, the system receives an address A and parameters X and Y (step 202). The address A is an address from a set of X consecutive addresses, wherein the address A is to be mapped to an entity E in a set of Y entities, and wherein Y need not be a power of two.

Next, the system computes $F=\text{floor}(\log_2(Y))$, where floor (Z) is the largest integer less than or equal to Z (step 204). The system also computes $C=\text{ceiling}(\log_2(Y))$, where ceiling(Z) is the smallest integer greater than or equal to Z (step 206).

The system then calculates L, which equals the value of the F least-significant bits of A, namely $\{A_{F-1}, A_{F-2}, \ldots, A_0\}$ (step 208), and M, which equals the value of the C most-significant bits of A, namely $\{A_{B-1}, A_{B-2}, \ldots, A_{B-C}\}$ (step 210). As mentioned above, these computations can involve selecting and shifting specific bits from address A. In one embodiment of the present invention, these operations involve using masking and shifting instructions to select the specified address bits.

Next, the system calculates $S=L+M$ (step 212).

Finally, the system determines if $S<Y$ (step 214). If so, (step 214-yes), the system sets $E=S$ (step 216). Otherwise, if $S\geq Y$ (step 214-no), the system sets $E=S-Y$ (step 218). Note that by using this conditional assignment the system effectively computes S modulo Y (for a non-power-of-two value of Y) without having to perform an expensive division operation.

Circuitry for Conditional Assignment

Figure 3:
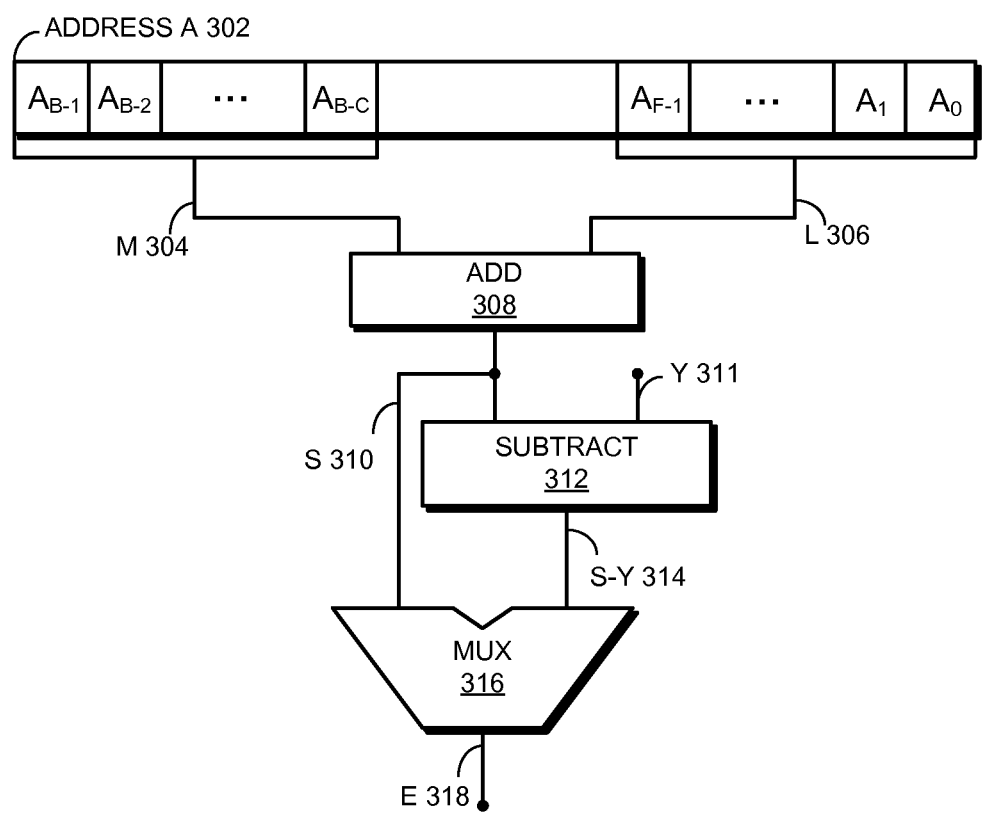
FIG. 3 illustrates circuitry for performing a conditional assignment in accordance with an embodiment of the present invention.

FIG. 3 illustrates circuitry for performing a conditional assignment in accordance with an embodiment of the present invention. The circuitry starts with a register which holds the address A 302, wherein the address A includes B address bits $\{A_{B-1}, A_{B-2}, \ldots, A_0\}$.

Next, the quantity M 304 is selected from the C most-significant bits of A, and the quantity L 306 is selected from the F least-significant bits of A. Note that because the values of C and F can change the circuitry to select M 304 and L 306 needs to selectively align the desired address bits. This type of alignment operation can involve using various shift registers, multiplexers, or shift instructions and is well-known in the art.

Adder circuit 308 then computes S=L+M. After S 310 is computed, subtraction circuit 312 subtracts Y 311 from S 310 to compute S−Y 314.

Next, the conditional assignment is performed by using the sign bit of S−Y 314 as a select input to a multiplexer 316, wherein multiplexer 316 routes either S or S−Y to its output E 318. If S−Y 314 is negative, multiplexer 316 selects E to be S. Otherwise, if S−Y is positive or zero, the multiplexer selects E to be S−Y.

EXAMPLES

An exemplary mapping for the case where X=16 and Y=4 appears in Table 1 below. In this case, F=floor($\log_2(4)$)=2, and C=ceiling($\log_2(4)$)=2. Hence, M=the two most-significant bits of A, namely $\{A_3, A_2\}$, and L=the two least-significant bits of A, namely $\{A_1, A_0\}$. The system computes S as L+M and then computes the difference S−Y (which equals S−4). If S−4 is negative, then E=S. Otherwise, E=S−4.

TABLE 1

| Entity$_0$ | Entity$_1$ | Entity$_2$ | Entity$_3$ |
|---|---|---|---|
| 0000 | 0001 | 0010 | 0011 |
| 0111 | 0100 | 0101 | 0110 |
| 1010 | 1011 | 1000 | 1001 |
| 1101 | 1110 | 1111 | 1100 |

For example, for the case where A=0011, M=00 and L=11. Hence, S=00+11=11. In this case, S(=11) is <Y(=100). Hence, E=S=11.

In another example, for the case where A=1111, M=11 and L=11. Hence, S=11+11=110. In this case, S(=110) is >Y(=100). Hence, E=S−Y=110−100=10.

An exemplary mapping for the case where X=12 and Y=3 appears in Table 2 below. In this case, F=floor($\log_2(3)$)=1, and C=ceiling($\log_2(2)$)=2. Hence, M=the two most-significant bits of A, namely $\{A_3, A_2\}$, and L=the one least-significant bit of A, namely $\{A_0\}$. The system computes S as L+M, and then computes the difference S−Y (which equals S−3). If S−3 is negative, then E=S. Otherwise, E=S−3.

For example, for the case where A=0011, M=00 and L=1. Hence, S=00+1=11. In this case, S(=1) is <Y(=11). Hence, E=S=1.

In another example, for the case where A=1001, M=10 and L=1. Hence, S=10+1=11. In this case, S(=11) is ≥Y(=11). Hence, E=S−Y=11−11=0.

TABLE 2

| Entity$_0$ | Entity$_1$ | Entity$_2$ |
|---|---|---|
| 0000 | 0001 | 0101 |
| 0010 | 0011 | 0111 |
| 1001 | 0100 | 1000 |
| 1011 | 0110 | 1010 |

The foregoing descriptions of embodiments have been presented for purposes of illustration and description only. They are not intended to be exhaustive or to limit the present description to the forms disclosed. Accordingly, many modifications and variations will be apparent to practitioners skilled in the art.

Although these devices and systems are illustrated as having a number of discrete components, these embodiments are intended to be functional descriptions of the various features that may be present rather than structural schematics of the embodiments described herein. Consequently, in these embodiments, two or more components may be combined into a single component and/or a position of one or more components may be changed.

Additionally, the above disclosure is not intended to limit the present description. The scope of the present description is defined by the appended claims.

What is claimed is:

1. A method for mapping an address to an entity, wherein the mapping interleaves addresses between a number of entities in a computer system, comprising:
   receiving an address A from a set of X consecutive addresses, wherein the address A is to be mapped to an entity E in a set of Y entities, and wherein Y need not be a power of two;
   obtaining F and C by using X, wherein F=floor($\log_2(Y)$) and C=ceiling($\log_2(Y)$);
   in response to receiving the address A, performing a set of operations for:
      calculating L, wherein L equals the value of the F least-significant bits of A;
      calculating M, wherein M equals the value of the C most-significant bits of A;
      calculating S=L+M; and
      comparing S to Y, wherein comparing S to Y comprises:
         if S<Y, then setting E=S, and
         if S≥Y, setting E=S−Y; and
   directing an operation associated with the address A to an entity E in the computer system.

2. The method of claim 1, wherein X=Y·$2^N$, wherein Y is a positive integer.

3. The method of claim 2, wherein obtaining F and C by using X comprises directly computing F and C from X and N, wherein N is a positive integer.

4. The method of claim 1, wherein the address A is more than F+C bits in length, so that the F least-significant bits of A do not overlap the C most-significant bits of A.

5. The method of claim 1, wherein obtaining F and C by using X involves computing F and C by using X.

6. The method of claim 1, wherein obtaining F and C by using X involves looking up precomputed values for F and C, wherein the values for F and C were precomputed from X.

7. The method of claim 1, wherein the conditional assignment, E=S if S<Y, and E=S−Y if S≥Y, is performed by using a subtraction circuit to compute S−Y, and then using a sign bit of S−Y as a select input to a multiplexer that selects an output E from either S or S−Y, wherein S is selected if S−Y is negative, and S−Y is selected if S−Y is positive or zero.

8. The method of claim 1,
wherein there exists a set of memory modules of varying sizes; and
wherein an entity is a virtual memory module that is either a memory module of a smallest size in a set of memory modules, or a partition of a larger memory module that is equal in size to the memory module of the smallest size.

9. The method of claim 1, wherein the entity E is one of:
a processor;
a dual inline memory module (DIMM);
a memory rank;
a memory bank; and
a cache bank.

10. The method of claim 1, wherein the address A is a memory address.

11. The method of claim 1, wherein receiving the address A comprises receiving Y with the address A, and
wherein obtaining F and C comprises calculating F=floor($\log_2(Y)$) and C=ceiling($\log_2(Y)$) from the received Y.

12. An apparatus that maps an address to an entity, wherein the mapping interleaves addresses between a number of entities in a computer system, comprising:
an input configured to receive an address A from a set of X consecutive addresses, wherein the address A is to be mapped to an entity E in a set of Y entities, and wherein Y need not be a power of two; and
computational circuitry configured to,
obtain F and C by using X, wherein F=floor($\log_2(Y)$) and C=ceiling($\log_2(Y)$),
wherein, in response to receiving the address A, the computational circuitry is configured to perform a set of operations to:
calculate L, wherein L equals the value of the F least-significant bits of A;
calculate M, wherein M equals the value of the C most-significant bits of A;
calculate S=L+M; and
compare S to Y, wherein comparing S to Y comprises:
if S<Y, set E=S, and
if S≥Y, set E=S−Y,
wherein the apparatus is configured to direct an operation associated with the address A to an entity E in the computer system.

13. The apparatus of claim 12, wherein X=Y·$2^N$, wherein Y is a positive integer.

14. The apparatus of claim 12, wherein the address A is more than F+C bits in length, so that the F least-significant bits of A do not overlap the C most-significant bits of A.

15. The apparatus of claim 12, wherein, while obtaining F and C by using X, the computational circuitry is configured to obtain F and C by computing F and C by using X.

16. The apparatus of claim 12, wherein, while obtaining F and C by using X, the computational circuitry is configured to obtain F and C by looking up precomputed values for F and C, wherein the values for F and C were precomputed from X.

17. The apparatus of claim 12, wherein the computational circuitry includes:
a subtraction circuit configured to compute S−Y; and
a multiplexer that selects an output E from either S or S−Y, wherein a sign bit of S−Y feeds in a select input of the multiplexer, so that S is selected if S−Y is negative, and S−Y is selected if S−Y is positive or zero.

18. The apparatus of claim 12,
wherein there exists a set of memory modules of varying sizes; and
wherein an entity is a virtual memory module that is either a memory module of a smallest size in a set of memory modules, or a partition of a larger memory module that is equal in size to the memory module of the smallest size.

19. A computer system, including a mechanism that maps an address to an entity, wherein the mapping interleaves addresses between a number of entities in the computer system, comprising:
a processor;
a memory;
an input configured to receive an address A from a set of X consecutive addresses, wherein the address A is to be mapped to an entity E in a set of Y entities, wherein Y need not be a power of two;
computational circuitry configured to,
obtain F and C by using X, wherein F=floor($\log_2(Y)$) and C=ceiling($\log_2(Y)$),
wherein, in response to receiving the address A, the computational circuitry is configured to perform a set of operations to:
calculate L, wherein L equals the value of the F least-significant bits of A;
calculate M, wherein M equals the value of the C most-significant bits of A;
calculate S=L+M; and
compare S to Y, wherein comparing S to Y comprises:
if S<Y, set E=S, and
if S≥Y, set E=S−Y,
wherein the computer system is configured to direct an operation associated with the address A to an entity E in the computer system.

20. The computer system of claim 19, wherein the computational circuitry includes:
a subtraction circuit configured to compute S−Y; and
a multiplexer that selects an output E from either S or S−Y, wherein a sign bit of S−Y feeds in a select input of the multiplexer, so that S is selected if S−Y is negative, and S−Y is selected if S−Y is positive or zero.

* * * * *

UNITED STATES PATENT AND TRADEMARK OFFICE
CERTIFICATE OF CORRECTION

PATENT NO. : 8,886,898 B2  
APPLICATION NO. : 12/543803  
DATED : November 11, 2014  
INVENTOR(S) : Cypher et al.

It is certified that error appears in the above-identified patent and that said Letters Patent is hereby corrected as shown below:

In the Specification

In column 5, line 53, delete ">Y(=100)." and insert -- $\geq Y(=100)$. --, therefor.

In column 5, line 62, delete "S=00+1=11." and insert -- S=00+1=1. --, therefor.

In the Claims

In column 6, line 35, in Claim 1, delete "X,wherein" and insert -- X, wherein --, therefor.

Signed and Sealed this  
Twenty-third Day of June, 2015

Michelle K. Lee  
*Director of the United States Patent and Trademark Office*